United States Patent
Chen et al.

(10) Patent No.: US 11,610,225 B2
(45) Date of Patent: *Mar. 21, 2023

(54) CONVERSION OPTIMIZATION WITH LONG ATTRIBUTION WINDOW

(71) Applicant: META PLATFORMS, INC., Menlo Park, CA (US)

(72) Inventors: Zheng Chen, Mountain View, CA (US); Shyamsundar Rajaram, San Francisco, CA (US); Pradheep K. Elango, Mountain View, CA (US)

(73) Assignee: META PLATFORMS, INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/854,513

(22) Filed: Apr. 21, 2020

(65) Prior Publication Data

US 2020/0265471 A1 Aug. 20, 2020

Related U.S. Application Data

(63) Continuation of application No. 15/364,999, filed on Nov. 30, 2016, now Pat. No. 10,664,866.

(51) Int. Cl.
*G06Q 30/00* (2012.01)
*G06Q 30/0251* (2023.01)
(Continued)

(52) U.S. Cl.
CPC ......... *G06Q 30/0254* (2013.01); *G06N 20/20* (2019.01); *G06Q 30/02* (2013.01);
(Continued)

(58) Field of Classification Search
CPC ............... G06Q 30/0254; G06Q 30/02; G06Q 30/0269; G06Q 30/0277; G06N 20/20; G06N 5/003
See application file for complete search history.

(56) References Cited

U.S. PATENT DOCUMENTS 5,680,541 A * 10/1997 Kurosu .............. G03G 15/5079
714/26
8,463,685 B2 * 6/2013 Masuda ................ G06Q 40/06
705/26.7
(Continued)

FOREIGN PATENT DOCUMENTS

CN 106537376 A * 3/2017 ........... G06F 16/337
WO WO-2006103451 A2 * 10/2006 ........... G06N 3/0436

OTHER PUBLICATIONS

Jayawardane; Attributing_Conversion_Credit_in_an_Online_Environment_An_Analysis_and_Classification; ISCBI 2015; p. 68-p. 73; 2015.*
(Continued)

*Primary Examiner* — Radu Andrei
(74) *Attorney, Agent, or Firm* — Mannava & Kang, P.C.

(57) ABSTRACT

An online system optimizes for longer attribution window conversions with an additive decomposition model by predicting the probability that a predefined action happens given an impression/click. The online system receives a content item from a content provider for display to a target user, and predicts a probability that a target user will convert given an interaction with the content item by the target user. The online system computes, by a first trained model, a short-term conversion probability of a conversion event happening within a first conversion window after the interaction. The online system computes, by a second trained model, a long-term conversion probability of the a conversion event happening within a second conversion window after the interaction, the second conversion window being longer than the first conversion window. The online system computes the conversion probability given the interaction based on the short-term conversion probability and the long-term conversion probability.

20 Claims, 5 Drawing Sheets

(51) Int. Cl.
  *G06N 20/20* (2019.01)
  *G06Q 30/0241* (2023.01)
  *G06Q 30/02* (2023.01)
  *G06N 5/00* (2023.01)
(52) U.S. Cl.
  CPC ..... *G06Q 30/0269* (2013.01); *G06Q 30/0277* (2013.01); *G06N 5/003* (2013.01)

(56) References Cited

U.S. PATENT DOCUMENTS

| | | | |
|---|---|---|---|
| 8,521,594 B1 | 8/2013 | Skoe et al. | |
| 9,589,278 B1* | 3/2017 | Wang | G06Q 30/0275 |
| 10,352,310 B2* | 7/2019 | Sakamoto | H02K 7/1823 |
| 2007/0247092 A1* | 10/2007 | Komatsu | H02P 6/06 |
| | | | 318/400.04 |
| 2010/0049586 A1 | 2/2010 | Shahshahani | |
| 2010/0198680 A1 | 8/2010 | Ma et al. | |
| 2011/0191169 A1* | 8/2011 | Cui | G06Q 30/0247 |
| | | | 705/14.46 |
| 2012/0316972 A1* | 12/2012 | Hu | G06F 16/313 |
| | | | 705/14.72 |
| 2013/0103622 A1* | 4/2013 | Matsuoka | F24F 11/62 |
| | | | 706/12 |
| 2013/0111261 A1* | 5/2013 | Dalton | G06F 11/2028 |
| | | | 714/E11.073 |
| 2013/0274928 A1* | 10/2013 | Matsuoka | G05B 19/042 |
| | | | 700/276 |
| 2014/0214535 A1* | 7/2014 | Kee | G06Q 30/0275 |
| | | | 705/14.53 |
| 2014/0316581 A1* | 10/2014 | Fadell | F24F 11/30 |
| | | | 700/276 |
| 2015/0066593 A1* | 3/2015 | Huang | G06Q 30/0202 |
| | | | 705/7.31 |
| 2015/0310483 A1 | 10/2015 | Kent et al. | |
| 2016/0048869 A1 | 2/2016 | Shim et al. | |
| 2016/0202693 A1* | 7/2016 | Noda | G05B 23/0283 |
| | | | 702/183 |
| 2016/0366622 A1* | 12/2016 | Yang | H04W 36/0085 |
| 2017/0278173 A1* | 9/2017 | Ettl | G06Q 30/0631 |
| 2018/0218283 A1* | 8/2018 | Jenson | G06Q 50/01 |
| 2018/0299871 A1* | 10/2018 | Pfaffinger | G05B 19/4187 |

OTHER PUBLICATIONS

Sinha; Estimating_the_incremental_effects_of_interactions_for_marketing_attribution; Adobe Research; 6 pages; 2015.*

Zhang; Multi-touch_Attribution_in_Online_Advertising_with_Survival_Theory; IEEE 2014; p. 687-p. 696; 2014.*

Bian J., et al., "User Action Interpretation for Online Content Optimization," IEEE Transactions on Knowledge and Data Engineering, Sep. 2013, vol. 25 (9), pp. 2161-2174.

Bulut A., "TopicMachine: Conversion Prediction in Search Advertising Using Latent Topic Models," IEEE Transactions on Knowledge and Data Engineering, Nov. 2014, vol. 26 (11), pp. 2846-2858.

* cited by examiner

Receive a content item from a content provider for display to a target user
510

↓

Detect an impression opportunity for the target user, select content items including the received content item, and predict for each content item a probability that the target user will convert given an interaction with the content item by the target user
520

↓

Compute, by a first trained model, a short-term conversion probability of a conversion event happening within a first conversion window of time after the time the interaction occurs
530

↓

Compute, by a second trained model, a long-term conversion probability of the conversion event happening within a second conversion window of time after the time the interaction occurs
540

↓

Compute an additive conversion probability given the detected interaction based on the short-term conversion probability and the long-term conversion probability
550

CONVERSION OPTIMIZATION WITH LONG ATTRIBUTION WINDOW

PRIORITY

This application is a Continuation of commonly assigned and co-pending U.S. patent application Ser. No. 15/364,999, filed Nov. 30, 2016, the disclosure of which is hereby incorporated by reference in its entirety.

BACKGROUND

This disclosure generally relates to content distribution of online systems, and in particular to optimizing for long attribution window (e.g., 14 days) conversion with an additive decomposition model.

Content providers produce content to target their content towards certain audiences within online systems. With the advent of online systems such as social networking systems, content providers have increasingly relied on the online systems to create effective sponsored content within the online system to greatly increase engagement among users of the online systems. There is a cost associated with sending content to a user, and the content provider would like to optimize how content is created and delivered to the user. If a content provider sends the content to a user that is not interested in the content, the content provider wastes resources. If the content provider does not send the content to a user when the user is receptive to the content, the content provider does not take advantage of the user's interest.

To enhance content delivery within an online system, the online system for a content provider may predict the probability of a predefined action happening after a campaign is launched from the content provider. However, the online system may have to wait until enough data is collected to improve delivery of content to users. For example, the online system can predict the probability of a predefined action happening given an impression/click, or can predict the conversion rate. However, conversion events can span over a wide range of content delivery spectrum, e.g., from clicking a link, viewing a home page of a content item, to adding to a shopping cart and purchasing. Existing solutions for modeling clicks and conversions predict the conversion rate for conversion events that happen within 1-day post click, i.e., a 1-day attribution window. Although a 1-day attribution window may be reasonable for conversion events such as viewing a product home page right after a click, other conversion events such as adding to a shopping cart or purchasing may happen days or even weeks after a click. For example, for content providers in the travel business, it usually takes a much longer time for a user to decide whether to buy airline tickets after the user clicks an online offering from a content provider. The gap between what existing solutions offer and what content providers really care about can have a negative impact on the content providers' experience with the online system.

SUMMARY

An online system optimizes for longer attribution window (e.g., 14 days) conversions with an additive decomposition model by predicting the probability that a predefined action (e.g., a purchase or other conversion action) happens given an impression/click, or predicts the conversion rate. In one embodiment, the additive decomposition model has two trained models: a first trained model and a second trained model. The first trained model is trained with fresh data, which is the most up-to-date conversion data of the online system (e.g., 1-day old conversion data collected by the online system). The second trained model is trained with delayed data, which is conversion data collected over a longer period of time, e.g., conversion data over 14 days. The fresh data keeps the additive decomposition model up to date in a rapidly changing online content delivery environment; the delayed data keeps the additive decomposition model on check with accurate conversion data of the online system.

Using the trained models, the online system selects content items which are more likely to be converted on by users. For example, the online system receives a content item from a content provider for display to multiple of users of the online system, and detects an impression opportunity for a target user of the multiple users of the online system. The online system selects multiple content items as candidates for display to the target user (including the content item received from the content provider). For each candidate content item, the online system computes, by the first trained model, a short-term conversion probability of a conversion event (e.g., purchasing) happening within a first conversion window of time (e.g., within 1 day) after the time the click or the view occurs. The online system computes, by the second trained model, a long-term conversion probability of the conversion event happening within a second conversion window of time (e.g., 14 days) after the time the click occurs. The online system computes the conversion probability for the conversion event based on the short-term conversion probability and the long-term conversion probability, e.g., computing the sum of the short-term conversion probability and the long-term conversion probability. The online system applies the computed prediction, including the conversion probability, in a ranking of the candidate content items to select one of the candidate content items for display to the target user.

In one embodiment, the short-term conversion probability for a conversion event is a product of a probability of the conversion event happening within a first conversion window of time and a probability of the conversion event eventually happening within the first conversion window of time, which is equal to 1. In other words, the short-term conversion probability for a conversion event is the probability of the conversion event happening within a first conversion window of time. The long-term conversion probability is a product of a probability of no conversion event happening within the first conversion window of time and the probability of a conversion event happening eventually given no conversion event happening within the first conversion window of time. The conversion event that did not happen within the first conversion window of time can happen after the first conversion window of time (e.g., within the second conversion window of time), or never happen.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5 is a flow chart of a process for optimizing long attribution window conversion with an additive decomposition model in an online system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
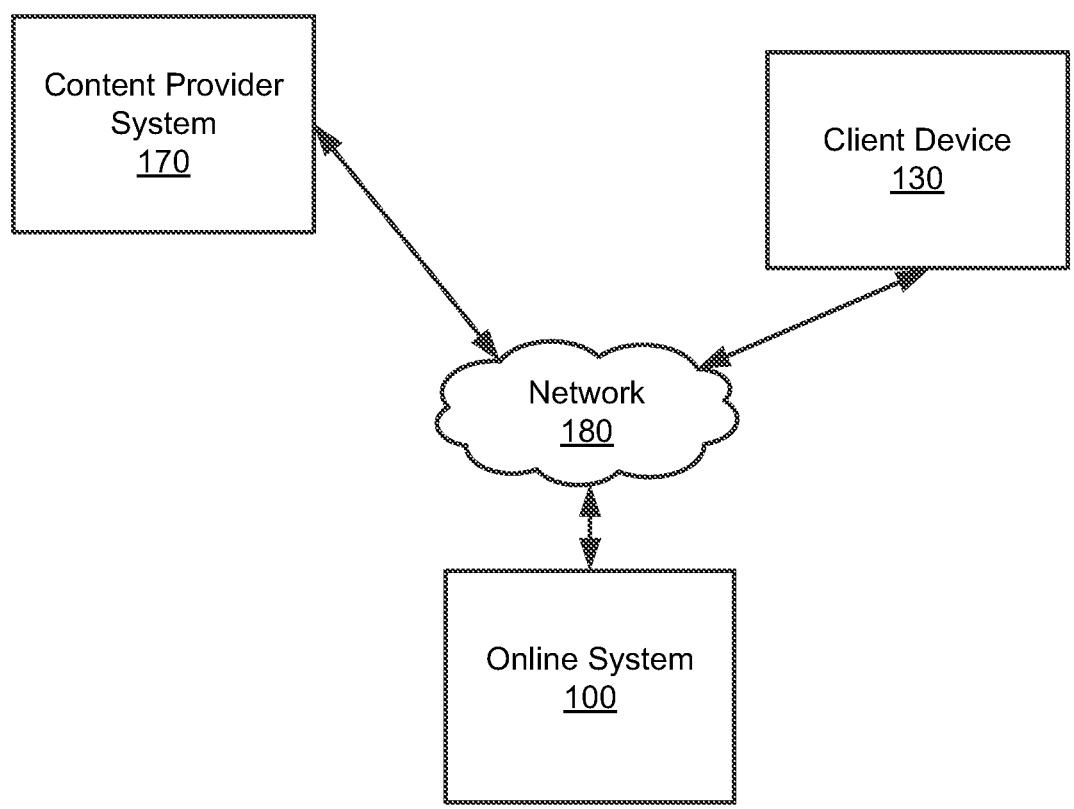
FIG. 1 is a block diagram of a system environment for optimizing long attribution window (e.g., 14 days) conversion with an additive decomposition model in an online system, in accordance with an embodiment.

FIG. 1 shows a system environment for optimizing long attribution window (e.g., 14 days) conversion with an additive decomposition model in an online system, in accordance with an embodiment. The system environment includes an online system 100, a client device 130, and a content provider system 170 connected to each other over a network 180. Other embodiments may include more or fewer online systems 100, content provider systems 170 and client devices 130. Conventional components such as network interfaces, security mechanisms, load balancers, failover servers, management and network operations consoles, and the like are not shown so as to not obscure the details of the system environment. In one embodiment, the online system 100 is a social networking system.

The client device 130 is a computing device capable of receiving user input as well as transmitting and/or receiving data via the network 180. In one embodiment, a client device 130 is a conventional computer system, such as a desktop or laptop computer. Alternatively, a client device 130 may be a device having computer functionality, such as a personal digital assistant (PDA), a mobile telephone, a smartphone or another suitable device. A client device 130 is configured to communicate via the network 180. In one embodiment, a client device 130 executes an application allowing a user of the client device 130 to interact with the online system 100. For example, a client device 130 executes a browser application to enable interaction between the client device 130 and the online system 100 via the network 180. In another embodiment, a client device 130 interacts with the online system 100 through an application programming interface (API) running on a native operating system of the client device 130, such as IOS® or ANDROID™.

The content provider system 170 is used by content providers for interacting with the online system 100 and/or users of the client device 130. In one embodiment, a content provider system 170 is an application provider communicating information describing computer applications for execution by a client device 130 or communicating data to client devices 130 for use by an application executing on the client device 130. In other embodiments, a content provider system 170 provides content or other information for presentation via a client device 130. For example, the content provider system 170 provides a third party website that communicates information to the online system 100, such as sponsored content or information about an application provided by the content provider. The sponsored content may be created by the entity that owns the content provider system 170. Such an entity may be a company (e.g., a third party outside of the online system 100) offering a product, service, or message that the company wishes to promote.

The network 180 includes any combination of local area and/or wide area networks, using both wired and/or wireless communication systems. In one embodiment, the network 180 uses standard communications technologies and/or protocols. For example, the network 180 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 180 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 180 may be represented using any suitable format, such as hypertext markup language (HTML) or extensible markup language (XML). In some embodiments, all or some of the communication links of the network 180 may be encrypted using any suitable technique or techniques.

The online system 100 includes a computing environment that allows users of the online system 100 to communicate or otherwise interact with each other and access content. The online system 100 stores information about the users, for example, user profile information and information about actions performed by users on the online system 100. In one embodiment, the online system 100 includes an additive decomposition module and a prediction module for optimizing long attribution window conversion in the online system 100, which is further described below. In some embodiments, the content is distributed by an external system that is not the online system 100 but a system that communicates with the online system 100 to obtain the necessary user information. The external system may communicate with the online system 100, for example, using APIs provided by the online system 100.

Figure 2:
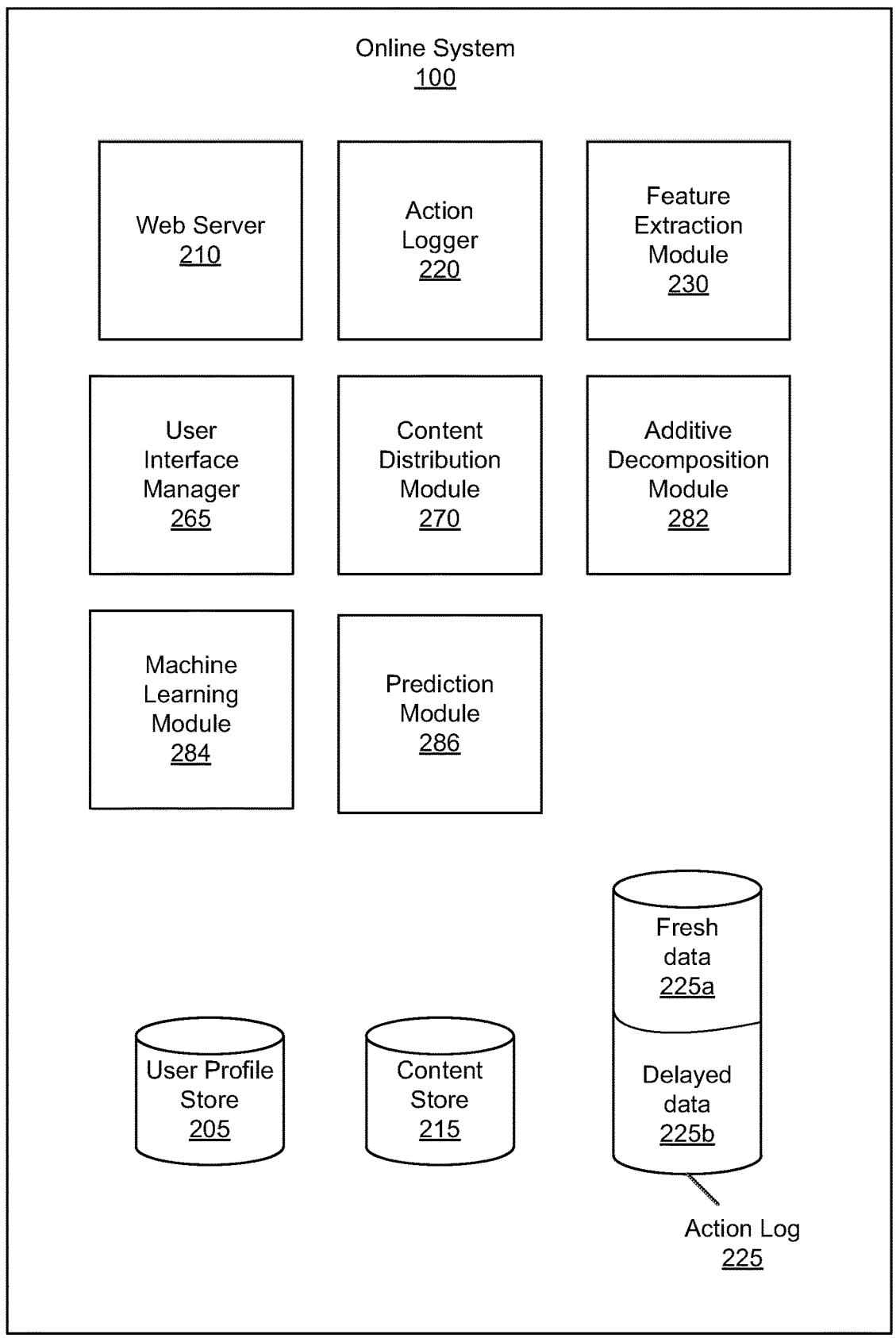
FIG. 2 is a block diagram of an online system for optimizing long attribution window conversion with an additive decomposition model, in accordance with an embodiment invention.

FIG. 2 illustrates the system architecture of an online system 100 for optimizing long attribution window conversion given an impression or a click with an additive decomposition model in the online system 100, in accordance with an embodiment. The online system 100 includes a user profile store 205, a content store 215, a web server 210, an action logger 220, an action log 225, a content distribution module 270, a user interface manager 265, a feature extraction module 230, an additive decomposition module 282, a machine learning module 284, and a prediction module 286.

The user profile store 205 stores user profiles of users of the online system 100. A user profile includes various data fields storing information describing the user including, but not restricted to, biography, demography, and descriptive information, such as gender, hobbies, location, work experience, educational history, and the like. A user profile of a user includes information provided by the user, for example, address, ethnicity, age, interests, and so on. The user profile of a user also includes user attributes determined by the online system 100 based on information stored on the online system 100.

The online system 100 additionally permits users of the online system 100 to establish connections (e.g., friendship type relationships, follower type relationships, etc.) with other users of the online system 100. Using information in the user profiles, connections between users, and any other suitable information, the online system 100 maintains a social graph of nodes interconnected by edges. Each node in the social graph represents an object associated with the online system 100 that may act on and/or be acted upon by another object associated with the online system 100. An edge between two nodes in the social graph represents a particular kind of connection between the two nodes. An edge may indicate that a particular user of the online system 100 has shown interest in a particular subject matter associated with content. For example, the user profile may be associated with edges that define a user's prior activity that includes, but is not limited to, visits to various web pages, searches for web pages, commenting and sharing web pages, liking content items, commenting on content items, sharing content items, joining groups, attending events, checking-in to locations, and buying products advertised by advertisements presented to the user.

In one embodiment, the online system 100 may use edges to generate stories describing actions performed by users, which are communicated to one or more additional users connected to the users through the online system 100. For example, the online system 100 may present a story to an additional user about a first user (e.g. a friend) that has liked a new game or application advertised by a content item presented to the first user. The additional user may choose to interact with the presented story thereby creating an edge in the social graph maintained by the online system 100 between the additional user and the subject matter of the story. The online system 100 may store this edge in an edge store (not shown). This edge may be retrieved from the edge store at a future time point when the online system 100 seeks to identify components that may align well with the additional user's preferences.

The content store 215 stores various types of content items received by the online system 100 from content providers. Examples of content items include video content, audio content, text content, an image, a link, and the like. Example of a content item also includes a web page that combines one or more different types of content items, for example, text, images, and videos. A content item may be a sponsored content item that is being sponsored by a content provider. A sponsored content item is also referred to herein as a promotional content item. A content item could be an advertisement of a product or service offered by a vendor.

The web server 210 links the online system 100 via a network (e.g., the network 180 shown in FIG. 1) to one or more client devices 130 and/or content provider system 170. The web server 210 serves web pages, as well as other web-related content, such as Flash, WL, and so forth. The web server 210 provides the functionality of receiving and routing messages between the online system 100 and the client devices 130 as well as other external systems. These messages can be instant messages, queued messages (e.g., email), text and SMS (short message service) messages, or any other suitable message type. In some embodiments, a message sent by a user to another can be viewed by other users of the online system 100, for example, by the connections of the user receiving the message. An example of a type of message that can be viewed by other users of the online system 100 besides the recipient of the message is a wall post.

The user interface manager 265 generates user interfaces for presentation of content to the users via client applications executing on the client devices 130 associated with the users. Example user interfaces include user interfaces for receiving interactions from users by the online system 100, user interfaces for receiving information describing content items and content providers, user interfaces for presenting recommendations for modifying target audience criteria, and the like.

The action logger 220 receives communications from the web server 210 about user actions within and/or external to the online system 100. The action logger 220 populates the action log 225 with information about user actions to track the user actions. When a user performs an action within the online system 100, the action logger 220 adds an entry for that action to the action log 225. Any action that a particular user takes with respect to another user is associated with each user's profile, through information maintained in a database or other data repository, such as the action log 225. Example user actions may include, for example, viewing content, attending an event posted by another user, posting a comment, "liking" a content item, clicking a content item, viewing a webpage of a content item, adding a content item to an online shopping cart, and purchasing a content item, among others.

The action log 225 stores information describing user actions within the online system 100, such as actions associated with conversion events. The user actions may be performed by the user with the online system 100. Alternatively, the user actions may be performed by the users with external systems and information describing these actions communicated to the online system 100 by the external systems. Users interact with various objects on the online system 100, e.g., content items presented to the users, and information describing these interactions is stored in the action log 225. Some forms of interactions with objects include: retrieving and interacting with the content, commenting on content, sharing links to content, recommending content to other users, indicating a like or dislike for a content item, communicating with other users, becoming member of a group, indicating interest in attending an event, and so on.

In one embodiment, an interaction is one or more actions performed by a user of the online system 100 on content items provided by a content provider. For example, an interaction may be an impression (presenting content to a viewing user) and a click. A conversion is one or more actions performed by the user given an interaction of the user. For example, if the interaction event is an impression and a click associated with a content item from a content provider, a conversion event may be moving the content item or a related item into a shopping cart or purchase of the content item after the interaction event.

In one embodiment, the action log 225 is partitioned to multiple parts, each of which stores a different type of user actions. For example, the action log 225 includes a part for storing fresh data 225a and a part for storing delayed data 225b. The fresh data 225a includes the most recent data stored in the action log 225 that is less than a threshold time T in age. For example, the threshold time T is 1 day, and fresh data 225a is data stored in the action log 225 that less than 1 day old. In one embodiment, the fresh data 225a is most up-to-date conversion data of the online system, e.g., 1-day old conversion data collected by the online system 100. For example, a conversion is attributed to a click only if the conversion occurred within 1 day after the click. The fresh data 225a is used by the online system 100 to train a model of an additive decomposition mode for predicting a short-term probability of a conversion event. The fresh data keeps the additive decomposition model up to date in a rapidly changing online content delivery environment.

The delayed data 225b includes data stored in the action log 225 that is greater or equal to a second threshold time T. For example, the second threshold time T is 14 days, a conversion is attributed to a click only if the delay between the click and conversion less than or equal to 14 days, and delayed data 225b is data stored in the action log 225 that is greater than 14 days old because the conversion data collected over the past 14 days is only partially correct. In one embodiment, the delayed data 225b is conversion data collected over a longer period of time. Assuming today is October 22, to train a long-term conversion probability model, the conversion data collected before October 9 is used because the conversion data collected between October 9 and October 22 is only partially correct with respect to the 14-day delay model. The delayed data 225b is used by the online system 100 to train another model of an additive decomposition mode for predicting a long-term probability of a conversion event, where the delayed data 225b represents ground-truth of conversion observed over the second threshold time. The delayed data 225b keeps the additive decomposition model on check with accurate conversion data of the online system 100. To determine whether data is fresh data or delayed data, the online system 100 checks the timestamp of the data (e.g., a click of a content item) stored in the action log 225, takes the difference of the current time to the timestamp of the data, and compares the difference to a threshold time T, which is 1 day. If the difference is less than or equal to the threshold time T, the data is fresh data 225a. If the difference is greater than or equal to the threshold time T, which is 14 days for a 14-day delay model, the data is delayed data 225b. The number "14 days" is used throughout as an example, but this longer or delayed attribution window (or long-term conversion probability) can be a different number of days. For example it could be 8 days, 10 day, 15 days, 20 days, 25 days, or more, depending on the circumstance. Similarly, the number "1 day" is used throughout as an example, but this shorter term attribution window (or short-term conversion probability) can be a different number of days, such as 2 days, 3 days, or more depending on the circumstance.

The feature extraction module 230 extracts features associated with an action, e.g., a click of a content item presented to the user. A feature is information associated with an action. For example, a feature may be an action type, a user who performed the action, the device the action was performed on, a time stamp the action took place, a location, etc.

In one embodiment, the feature extraction module 230 uses a model trained by the machine learning module 284 to extract features associated with user clicks of content items presented to the users. Examples of extracted features include click through rate, type of content item being clicked, timestamp of the click, actors of the click, and the like. The feature extraction module 230 generates a feature vector for each click, where the feature vector includes information describing the extracted click features, e.g., key-value pairs. The extracted features are used by the additive decomposition module 282 to train a short-term conversion prediction model and a long-term conversion prediction model.

Predicting Conversion Probability

The online system 100 optimizes for long attribution window conversions with an additive decomposition model by predicting the probability that a conversion event (e.g., a purchase) happens given an interaction (e.g., an impression or click), the conversion rate, with the long attribution window (e.g., 14 days). An interaction is one or more actions performed by a user of the online system 100 on content items provided by a content provider. For example, an interaction may be an impression (presenting content to a viewing user) and a click. A conversion is one or more actions performed by the user given an interaction of the user. For example, if the interaction event is an impression and a click associated with a content item from a content provider, a conversion event may be moving the content item or a related item into a shopping cart or purchase of the content item after the interaction event.

In some embodiments, the prediction of conversion probability is performed at the time of an impression opportunity becomes available for a user. For example, the user may go to a page in the online system, such as a newsfeed, and the online system provides the content on the page and also provides certain content item from content providers, such as ads from advertisers. The online system can access or retrieve from storage various candidate content items for the user (e.g., all ads for which the user meets the targeting criteria). For each of these candidates, the online system can perform a prediction of the likelihood that the user will take a particular action related to the content item (e.g., purchase a product advertised in an ad) given an interaction with the content item (e.g., given a click by the user on the ad, or given even just that an impression of the ad occurred). The details of the prediction of the likelihood of the conversion by the user are described below. This prediction is used in the ranking of the candidate content items (e.g., content that the user is more likely to convert on relative to other content is ranked higher than the other content). Various other factors about the user can also be included in the ranking (such as the user's profile and interests in the content, the user's social network connections interest in the content, etc.). The ranked candidates (or the highest ranked candidates) can enter an auction in some embodiments (e.g., an ad auction), in which content provider's bids for presenting the content item to the user are considered in ultimately selecting a winning ad with the highest bid for presentation to the user.

The prediction described above that is used in the ranking is performed by training a model to make the prediction. To obtain the most relevant conversion data of a campaign, the online system 100 may wait a post-interaction time window after the campaign is launched to collect enough conversion data of campaign. The online system 100 may present content from a campaign to its target audiences, receive interactions on the content from the target audiences, and collect conversion data from the target audiences that occurred within a predefined post-interaction time window, e.g., 1 day for fresh data and 14 days for delayed data. Thus, the system can consider historical data of different users where the system has tracked what the users does post impression or post click to see if the users then convert and how long it takes. The online system 100 trains a conversion prediction model based on the collected data from many campaigns and corresponding target audiences, and the model may provide information that is an important factor for subsequent delivery of the content, e.g., predicted conversion rate based on fresh data and delayed data.

One way in which the online system tracks conversions is via tracking pixels or pieces of code that the online system provides for content providers to include on pages within their websites to monitor users visiting the websites that have not opted out of tracking. The tracking pixel is a segment of HTML code. A tracking pixel might be included on various pages, including on a product page describing a product, on a shopping cart page that the user visits upon putting something into a shopping cart, on a checkout page that the user visits to checkout and purchase a product, etc. For example, a tracking pixel is a transparent 1×1 image, an iframe, or other suitable object. When a user's browser loads a page having the tracking pixel, the tracking pixel results in the user's browser attempting to retrieve the content for that pixel. Specifically, the browser contacts the online system to retrieve the content. The request sent to the online system, however, actually includes various data about the user's actions taken on the third party website. The third party website can control what data is sent to the online system. For example, the third party system may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system can also be retrieved by the online system, which can include various data about the user, such as the online systems' UID for the user, information about the client device and the browser, such as the Internet Protocol (IP) address of the client device, among other data. Tracking can also be performed on mobile applications of content providers by using a software development kit (SDK) of the online system or via an application programming interface (API) of the online system to track events (e.g., purchases) that occur by users on the content provider's app that are reported to the online system. In this manner, the online system can track historical conversions by users on third party sites and match them to the online system user for tracking and use in training the prediction model regarding conversions.

In addition to interest in short-term conversion rate for content provided by content providers, it is noted that content providers are also interested in conversion events happening in a longer conversion window of time (e.g., within N days of an interaction, where N=14 days). The online system 100 trains a model based on data collected over N days after an interaction, e.g., a click or an impression. In one embodiment, the online system 100 may use historical conversion data to train a model, the historical data being delayed data 225b that is older than or equal to N days. That is, the online system 100 may identify an interaction from the historical data (e.g., action log 225) that is older than or equal to N days old. Identifying an interaction from data that is less than N days old will not have enough historical data to provide information on whether a conversion event occurs from the interaction event within the N days conversion window of time. Some content providers may see more conversions occurring in a longer conversion window of time. However, the larger N becomes, the older the delayed data 225b becomes for training a model, which may degrade the accuracy of the N days delayed model.

Additive Decomposition Model

In one embodiment, the online system 100 includes a trained additive decomposition model to optimize for long attribution window conversions. The additive decomposition model may be used to improve the freshness and accuracy of the N days delayed model by using fresh data 225a in addition to the delayed data 225b. In this embodiment, fresh data 225a is used to predict a conversion event occurring in a first conversion window of time (e.g., 1 day) and delayed data is used to predict a conversion event occurring outside the first conversion window of time but within a second conversion window of time (e.g., 14 days) that is larger than the first time window. Thus, the freshness of the N days delayed model may be improved by using fresh data 225a while keeping the accuracy of the prediction of the conversion event using delayed data 225b.

Figure 3:
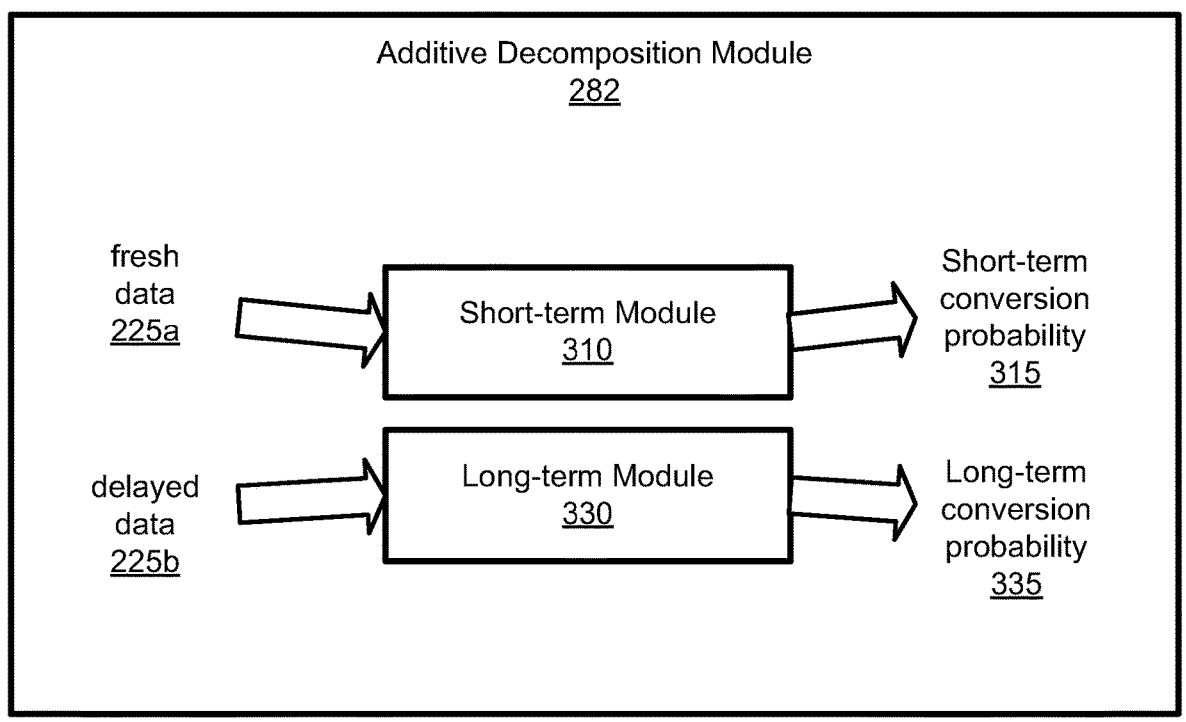
FIG. 3 is a block diagram of an additive decomposition module for modeling a short-term conversion rate and for modeling a long-term conversion rate in an online system, in accordance with an embodiment.

FIG. 3 is a block diagram of an additive decomposition module 282 for modeling a short-term conversion rate and for modeling a long-term conversion rate of a conversion event in the online system 100, in accordance with an embodiment. The additive decomposition module 282 includes a short-term module 310 and a long-term module 330. The short-term module 310 includes a first trained model to determine the short-term conversion probability 315. The long-term module 330 includes a second trained model to determine the long-term conversion probability 335. The machine learning module 284 trains the first model using fresh data 225a and the second model using delayed data 225b from action log 225.

The machine learning module 284 applies machine learning techniques to generate a trained model that when applied to content items outputs indications of whether the content items have the associated property or properties, e.g., that when applied to content items outputs estimates of the click-through rates of the content items. As part of the generation of the trained model, the machine learning module 284 forms a training set of content items by identifying a positive training set of content items that have been determined to have the property in question, and, in some embodiments, forms a negative training set of content items that lack the property in question. For example, the machine learning module 284 uses the fresh data 225a as the training set for training the first model for predicting short-term conversion rate and uses the delayed data 225b as the training set for training the second model for predicting long-term conversion rate.

The machine learning module 284 extracts feature values from the content items of the training set, the features being variables deemed potentially relevant to whether or not the content items have the associated property or properties. Specifically, the feature values extracted by the machine learning module 284 include features associated with pre-defined events e.g., timestamps of clicks/impressions, timestamps of conversion, types of conversions (e.g. purchasing or adding to shopping carts). An ordered list of the extracted features for a post-click or post-impression conversion is herein referred to as the feature vector for the conversion.

The machine learning module 284 uses supervised machine learning to train the first model and the second model, with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The trained model, when applied to the feature vector extracted from a click, or impression, outputs an estimation of a likelihood that there is a conversion eventually with respect to its corresponding attribution window.

Returning back to FIG. 3, the short-term module 310 applies the first model trained by the machine learning module 284 to the fresh data 225a to generate short-term conversion probability 315. In one embodiment, the short-term conversion probability 315 is a product of a probability of a conversion event happening within a first conversion window of time and a probability of the conversion event happening (eventually) given the conversion event happens within the first conversion window of time as shown in Equation (1) below. The first conversion window of time is set to 1 day, which reflects the freshness of the conversion data of the fresh data 225a. The probability of the conversion event happening given the conversion event happens within the first conversion window of time after the conversion event is 1. Therefore, the short-term conversion probability can be simplified to be the probability of a conversion event happening within a first conversion window of time.

$$P_{short} = P(D<=1) * (P(C=1|D<=1)) \quad (1)$$

where C={0, 1}, a random variable indicates whether if there is a conversion eventually with respect to the corresponding attribution window; D={1, ..., 14, ..., NULL}, a random variable indicates the conversion delay (in days) if a conversion happens, NULL if not; $P(D<=1)$ is the probability of conversion happens within 1 day, which is the first conversion window of time; and $P(C=1|D<=1)$ is the probability of eventually converted given conversion happens within 1 day, which is 1.

The long-term conversion probability 335 is a product of a probability of no conversion event happening within the first conversion window of time and the probability of a conversion event happening eventually given no conversion event happening within the first conversion window of time as shown in Equation (2) below. The probability of a conversion event happening eventually may be estimated by the probability of a conversion event happening outside the first conversion window but within a second conversion window of time. The long-term module 330 determines the long-term conversion probability 335 based on delayed data 225b. The delayed data 225b has a threshold time T that is greater or equal to the second conversion window of time. For example, if the second conversion window of time is 14 days, the delayed data 225b is greater or equal to 14 days old.

$$P_{long} = P(D>1) * (P(C=1|D>1)) \quad (2)$$

where $P(D>1)$ is the probability that the conversion does not happen in the first day; it can convert later or never happen, and $P(D>1)=1-P(D<=1)$; and $P(C=1|D>1)$ is the probability of eventually converted given that conversion did not happen within the first day. To train the second model used by the long-term module 330, the training data (e.g., the delayed data 225b) are at least 14 days old if the second conversion window of time is 14 days so that the delayed data approximate ground truth of the conversion data over the past 14 days.

Given a feature vector of a click or impression, the additive decomposition module 282 is configured to model the probability of whether there is a conversion eventually with respect to the corresponding attribution window as shown in Equation (3) below:

$$P(C=1) = P_{short} + P_{long} \quad (3)$$
$$= [P(D<=1) * (P(C=1|D<=1))] +$$
$$[P(D>1) * (P(C=1|D>1))]$$

where the model probability is decomposed to two parts: the short-term conversion probability and the long-term conversion probability.

The prediction module 286 predicts the probability of a conversion event happening with respect to an attribution window based on the results from the additive decomposition module 282. In one embodiment, the prediction module 286 predicts this probability by taking the sum of the short-term probability 315 and the long-term probability 335 from the additive decomposition module 282 as shown in Equation (3) above.

Figure 4:
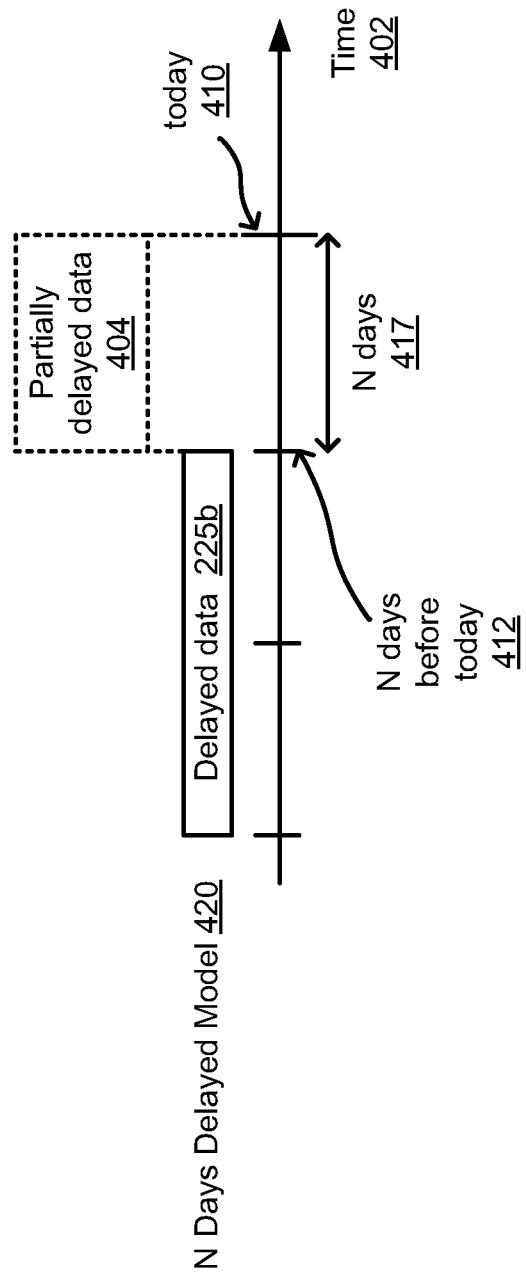
FIG. 4 is an example timeline for modeling a short-term conversion rate and for modeling a long-term conversion rate in an online system, in accordance with an embodiment.

FIG. 4 is an example timeline for modeling a short-term conversion rate and for modeling a long-term conversion rate in the online system 100, in accordance with an embodiment. The timeline depicts the age of training data that may be used for an N days delayed model 420 of an additive decomposition model. The timeline 402 shows today 410, N days before today 412, and a second conversion window of time of N days 417. The N days delayed model 420 is trained with delayed data 225b that is older than or equal to N days in age. For example, if the current date is Jul. 15, 2016, a 14 days delayed model (N=14) is trained with data that is stored on or before Jul. 1, 2016. The data between Jul. 15, 2016 and today is partially delayed data 404, which is not used in training the N days delayed model because the data cannot be determined for its truth for a N-day conversion window of time at today's date. The N days delayed model 420 is used to model the long-term conversion rate given a click or impression. The additive decomposition model uses the fresh data 225a, e.g., 1 day old conversion data, to predict the short-term conversion rate given a click or impression. For example, given a 1-day attribution window for modeling short-term conversion rate, when a click is detected by the online system 100, the additive decomposition model needs to wait for one day to determine whether this click leads to a conversion or not. From both the short-term conversion rate prediction and the long-term conversion rate prediction, the additive decomposition model optimizes the conversion rate estimation for longer attribution window conversions for a given click/impression.

FIG. 5 is a flow chart of a process for optimizing long attribution window conversion with an additive decomposition model in an online system, in accordance with an embodiment. The online system 100 receives 510 a content item from a content provider for display to a target user. The online system 100 detects 520 an impression opportunity for the target user. The online system 100 also selects a plurality of content items as candidates for display to the target user. The plurality of content items includes the received content item from the content provider. The online system 100 also predicts, for each of the candidate content items, a probability that the target user will convert given an interaction with the content item by the target user. The online system 100 computes 530, by a first trained model, a short-term conversion probability of a conversion event happening within a first conversion window of time after the time the interaction occurs, e.g., 1 day conversion window of time. The online system 100 computes 540, by a second trained model, a long-term conversion probability of the conversion event happening within a second conversion window of time after the time the interaction occurs, e.g., 14 days conversion window of time. The online system 100 computes 550 an additive conversion probability given the detected interaction based on the short-term conversion probability and the long-term conversion probability.

SUMMARY

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system, comprising:
   a processor; and
   a memory storing instructions, which when executed by the processor, cause the processor to perform:
   selecting, from a plurality of candidate content items, a subset of the plurality of candidate content items to be displayed to a target user;
   predicting, for each of the subset of the plurality of candidate content items, that the target user will convert given an interaction with content by the target user;
   determining, using an additive conversion probability technique based on at least one additive decomposition model, a probability that the target user will convert given the interaction with the content by the target user, wherein:
   the at least one additive decomposition model comprises at least a first trained model and second trained model,
   the first trained model is trained with fresh data and the second trained model is trained with delayed data, and
   the probability comprises a short-term conversion probability and a long-term conversion probability; and
   ranking the subset of the plurality of candidate content items to be selected and displayed to the target user, at a user device, based on the determined probability.

2. The system of claim 1, wherein:
   the plurality of candidate content items is received from a content provider for presenting to a plurality of users; and
   the subset of the plurality of candidate content items are each selected based on an impression opportunity.

3. The system of claim 1, wherein the interaction with the content comprises at least one of an impression on the target user or an action taken by the target user.

4. The system of claim 1, wherein the additive conversion probability technique comprises:
   determining the short-term conversion probability of a conversion event to occur within a first conversion window of time, the determination based on data collected by the system that is less than or equal in age to the first conversion window of time; and
   determining the long-term conversion probability of a conversion event to occur within a second conversion window of time, the determination based on data collected by the system that is greater than or equal in age to the second conversion window of time.

5. The system of claim 4, wherein the additive conversion probability technique further comprises:
   determining an additive conversion probability based on an additive function of the short-term conversion probability and the long-term conversion probability.

6. The system of claim 4, wherein the first conversion window of time and the second conversion window of time each begins after an initial interaction occurs.

7. The system of claim 4, wherein the first conversion window of time is 1 day.

8. The system of claim 4, wherein the second conversion window of time is 14 days.

9. The system of claim 4, wherein the conversion event comprises an action towards purchasing an item associated with the content items.

10. A method, comprising:
    selecting, by a processor, from a plurality of candidate content items, a subset of the plurality of candidate content items to be displayed to a target user;
    predicting, for each of the subset of the plurality of candidate content items, that the target user will convert given an interaction with content by the target user;
    determining, using an additive conversion probability technique based on at least one additive decomposition model, a probability that the target user will convert given the interaction with the content by the target user, wherein:
   the at least one additive decomposition model comprises at least a first trained model and second trained model,
   the first trained model is trained with fresh data and the second trained model is trained with delayed data, and
   the probability comprises a short-term conversion probability and a long-term conversion probability; and
ranking the subset of the plurality of candidate content items to be selected and displayed to the target user based on the determined probability.

11. The method of claim 10, wherein:
the plurality of candidate content items is received from a content provider for presenting to a plurality of users; and
the subset of the plurality of candidate content items are each selected based on an impression opportunity.

12. The method of claim 10, wherein the additive conversion probability technique comprises:
determining the short-term conversion probability of a conversion event to occur within a first conversion window of time, the determination based on data collected by a system that is less than or equal in age to the first conversion window of time;
determining the long-term conversion probability of a conversion event to occur within a second conversion window of time, the determination based on data collected by the system that is greater than or equal in age to the second conversion window of time; and
determining an additive conversion probability based on an additive function of the short-term conversion probability and the long-term conversion probability.

13. The method of claim 12, wherein the first conversion window of time and the second conversion window of time each begins after an initial interaction occurs.

14. The method of claim 12, wherein the first conversion window of time is 1 day, and the second conversion window of time is 14 days.

15. The method of claim 12, wherein the conversion event comprises an action towards purchasing an item associated with the content items.

16. A non-transitory computer-readable storage medium having instructions stored thereon, which when executed cause a processor to perform:
selecting, from a plurality of candidate content items, a subset of the plurality of candidate content items to be displayed to a target user;
predicting, for each of the subset of the plurality of candidate content items, that the target user will convert given an interaction with content by the target user;
determining, using an additive conversion probability technique based on at least one additive decomposition model, a probability that the target user will convert given the interaction with the content by the target user, wherein:
   the at least one additive decomposition model comprises at least a first trained model and second trained model,
   the first trained model is trained with fresh data and the second trained model is trained with delayed data, and
   the probability comprises a short-term conversion probability and a long-term conversion probability; and
ranking the subset of the plurality of candidate content items to be selected and displayed to the target user based on the determined probability.

17. The non-transitory computer-readable storage medium of claim 16, wherein:
the plurality of candidate content items is received from a content provider for presenting to a plurality of users; and
the subset of the plurality of candidate content items are each selected based on an impression opportunity.

18. The non-transitory computer-readable storage medium of claim 16, wherein the additive conversion probability technique comprises:
determining the short-term conversion probability of a conversion event to occur within a first conversion window of time, the determination based on data collected that is less than or equal in age to the first conversion window of time;
determining the long-term conversion probability of a conversion event to occur within a second conversion window of time, the determination based on data collected that is greater than or equal in age to the second conversion window of time; and
determining an additive conversion probability based on an additive function of the short-term conversion probability and the long-term conversion probability.

19. The non-transitory computer-readable storage medium of claim 18, wherein:
the first conversion window of time and the second conversion window of time each begins after an initial interaction occurs; and
the first conversion window of time is 1 day, and the second conversion window of time is 14 days.

20. The non-transitory computer-readable storage medium of claim 18, wherein the conversion event comprises an action towards purchasing an item associated with the content items.

* * * * *